United States Patent Office 3,359,251
Patented Dec. 19, 1967

3,359,251
PROCESS IMPROVEMENT FOR CONTROLLING MOLECULAR WEIGHT OF AN ALPHA-OLEFIN REACTION
Kenneth W. Doak, Wyckoff, N.J., assignor to Rexall Drug and Chemical Company, Los Angeles, Calif., a corporation of Delaware
No Drawing. Filed Feb. 20, 1964, Ser. No. 346,126
2 Claims. (Cl. 260—94.9)

This invention is directed to an improvement in a process for effecting molecular weight control of an alpha-olefin polymerization system wherein hydrogen is used for molecular weight control. The invention is specifically directed to an improvement in the use of hydrogen for obtaining better molecular weight control of alpha-olefin polymers produced by a Ziegler catalyst system and/or a Natta/Ziegler catalyst system. Specifically, the invention has reference to catalyst systems which polymerize alpha-olefins such as ethylene to very high molecular weight polymers and which systems must employ some means for reducing the molecular weight of the polymer, such as hydrogen.

In ethylene polymerizations employing so-called Ziegler catalyst systems, exemplified by the brown titanium trichloride system obtained by reducing titanium tetrachloride with an aluminum alkyl, it was reported possible to control the molecular weight of the polymer to some effective extent by variation of the aluminum to titanium mole ratios employed in the polymerization reaction (see Belgian Patent 540,459, Feb. 9, 1956).

At a subsequent date following the initial work of Ziegler in polymerizing ethylene with the brown titanium trichloride catalyst system as mentioned above, Vandenberg in U.S. Patent 3,051,690, dated Aug. 28, 1962, described another effective means for controlling molecular weight of a variety of homopolymers including those of the alpha-olefin series wherein hydrogen was used as the molecular weight control agent in catalyst systems of the Ziegler type. The Vandenberg process for controlling molecular weight of ethylene or other alpha-olefin polymers thus became one additional and effective method for preparing polymers of a variety of melt indices.

In addition to the foregoing work on molecular weight control by the use of hydrogen and variations of mole ratios of Ziegler catalyst systems in polymerization reactions at low temperatures and pressures, Natta in Belgian Patent 543,259, dated Nov. 30, 1955, disclosed that violet titanium trichloride catalysts with, for example, aluminum compounds, were extremely effective in polymerization of propylene and other alpha-olefins to high isotactic content polymers. The titanium trichloride system has thus been applied to the polymerization of ethylene and a variety of other alpha-olefin monomers. A characteristic of the violet titanium trichloride catalyst system, however, is that it yields extremely high molecular weight polymers of ethylene whose molecular weight cannot be readily controlled by varying the aluminum to titanium mol ratios. Where hydrogen is used as the molecular weight control agent, certain difficulties were encountered including reduced reaction rates and for certain systems, large amounts of hydrogen were required to obtain a measurable melt index according to standard ASTM procedures.

There is very little published with respect to the behavior of hydrogen in hydrocarbon systems containing a heterogeneous mixture of liquids and solids. Published equilibrium constants of hydrogen in the presence of some hydrocarbons indicate that the K value or the mole fraction of hydrogen in the vapor phase over the mole fraction of hydrogen in the liquid phase varies from one hydrocarbon to another. The K value not only varies from hydrocarbon to hydrocarbon, but also varies in the same system, that is, it is a function of temperature of the system, as well as the pressure. An important factor to be considered in determing the K value of hydrogen in any hydrocarbon system is the solids content, for example, in a reactor, as well as the presence of other diluents or monomers. All of these factors affect the solubility of hydrogen in any particular hydrogen-hydrocarbon system so that it is difficult or practically impossible to predict its behavior in a polymerization system involving an alpha-olefin. Thus, polymerization rates, exothermicity of the reaction, temperatures employed, conversion levels, amounts of diluent, types of diluent, all have to be considered in attempts to arrive at some empirical relationship which may be used to predict the amount of hydrogen required for each specific condition for a specific melt index. As mentioned, however, such an approach is extremely difficult, if not impossible and consequently other processing conditions which can be more readily applied and controlled in the use of hydrogen to control molecular weight have been sought after.

With the foregoing in mind, it is an object of this invention to provide an improvement in a process for polymerizing an alpha-olefin employing hydrogen to control molecular weight and a catalyst formed by mixing a halide of a metal selected from the group consisting of metals of Groups IVb, Vb, VIb and VIII of the Periodic Table with an organometallic compound selected from the group consisting of alkali metals, alkaline earth metals and zinc (hereinafter referred to as Ziegler or Natta-Ziegler catalyst systems) in order to obtain a polymer product of varying molecular weight.

It is a further object of this invention to provide an improved process for the use of hydrogen as a molecular weight control agent in a process employing titanium trichloride as a cocatalyst with an aluminum compound for preparing a polymer with varying molecular weight.

A still further object is to provide an improved process for using hydrogen to control molecular weight in a process wherein a titanium trichloride cocatalyst with an aluminum alkyl is used in the presence of an inert hydrocarbon diluent boiling below 10° C.

A specific object of this invention is to provide an improved process for preparing polyethylene of a variable melt index by the use of hydrogen and employing pressures of from 150 p.s.i.g. to 5,000 p.s.i.g. in the presence of a titanium trichloride catalyst and an aluminum alkyl and a hydrocarbon as a diluent having a boiling point of from —45° to about 0° C.

The foregoing objectives of this invention are achieved by the improvement provided in a process for polymerizing an alpha-olefin wherein hydrogen is employed to effect molecular weight control wherein as a catalyst there is employed the product formed by mixing a compound of a metal selected from the groups consisting of metals of Groups IVb, Vb, and VIb and VIII of the Periodic Table and an organometallic compound of a metal selected from the group consisting of alkali metals, alkaline earth metals and zinc at reaction temperatures of from about room temperature to about 200° F., the improvement comprising continuously introducing hydrogen to the reaction zone for the foregoing polymerization at temperatures of from reaction temperature to 25° F. higher than reaction temperatures where the polymerization reaction is carried out at from room temperature to about 125° F.; and from about 10° F. below to 25° above the reaction temperature for reactions carried out at from 125° F. to about 200° F.

The process of this invention, although applicable to polymerizations involving alpha-olefins such as ethylene, propylene, butene-1, hexene-1 and up to dodecene-1, as well as branched chain 1-olefins such as 4- and 5-methyl pentenes, 3-methyl-1-butene and the like, will be specifically described with reference to the polymerization of ethylene. Further, although the process is applicable to the foregoing Ziegler and Natta-Ziegler catalysts, reference will be made hereinafter to the violet titanium trichloride activated with an aluminum alkyl compound. Still further, while the invention is applicable to the polymerization of alpha-olefins with Ziegler or Natta-Ziegler catalyst systems in a variety of diluents for the polymerization reaction or in processes wherein the monomer per se is used as its own dispersing agent (bulk reactions), reference will be made hereinafter to the use of inert paraffinic (in the process) diluents such as propane or butane, hydrocarbons boiling below about 10° C. and preferably from −45° to 0° C., for use in the process. A preferred diluent is butane.

Restating the foregoing, in a preferred embodiment it has been found that where hydrogen is continuously introduced into a reaction zone wherein a polymerization of ethylene is being conducted at temperatures of from room temperature to about 200° F., in the presence of butane as the diluent and at pressures of from about 150 to 5,000 p.s.i., a more efficient and effective control of the molecular weight of the polyethylene is obtained if the hydrogen, when initially introduced or when recycled, is brought to the reaction vessel, preferably to contact the liquid in the zone, at a temperature preferably higher than the temperature in the reaction zone for polymerization reactions carried out at from room temperature (about 68° to 70° F.) to about 125° F. Thus, where the reaction is being conducted at room temperature, for example, the introduced hydrogen should be heated preferably to from 10° to 25° F. higher than room temperature. Where the reaction is being conducted at a higher temperature, for example, above 125° F. and up to 200° F., the introduced hydrogen should be at a temperature at least 10° below the reaction temperature, but preferably at the reaction temperature or higher, up to 25° F. for example, so long as the hydrogen introduced does not change the reaction temperature considerably if product specifications require the use of a specific polymerization temperature. In selecting the best recycle temperature for hydrogen, consideration should also be given to the pressure being used in the reaction system, since ordinarily increasing the pressure of the system increases the amount of hydrogen in equilibrium in the liquid phase to that of hydrogen in the vapor phase, that is, the K value is affected.

In the development of the process of this invention, it was found that the important property of melt index of the polymer could be readily controlled by recycling hot hydrogen to the reaction system as heretofore mentioned. Where the hydrogen was taken from the reactor and cooled prior to recycle or was introduced thereto at temperatures substantially below those desired, it was found that inadequate molecular weight control resulted and larger volumes of hydrogen were required to obtain a measurable melt index, specifically when employing the violet titanium trichloride as a cocatalyst in ethylene polymerizations. Thus, prior to the use of the process herein, difficulty was encountered in controlling molecular weight of polyethylene by employing reaction conditions known in the prior art. This difficulty was especially aggravated where very high molecular weight polyethylene was produced such as by a recently developed process using butane as a diluent and the highly active violet titanium trichloride cocrystallized with aluminum chloride and activated with an aluminum triethyl. In this process, pressures of from 150 to 5,000 p.s.i. are employed and very high molecular weight polymers of densities in the range of 0.96 and higher are consistently produced. So high was the molecular weight of the polyethylene produced in this process that the melt index was not measurable under standard ASTM conditions. Since variation of aluminum to titanium ratios was not workable to control molecular weight of the polyethylene produced by this process, specifically since high ratios of aluminum to titanium can inherently be used in the system, attempts were made to use hydrogen to control the molecular weight. However, when hydrogen was used in these attempts, it was found that merely introducing it to the reactor, or recycling it through a condenser as is known in the art and then recycling to the reactor did not give adequate molecular weight control of the polymer produced. Large amounts of hydrogen were required to obtain a melt index of about 0.2 (ASTM D-1238–57T) in those polymerization reactions involving ethylene. When, however, the hydrogen was heated in accordance with the teachings herein and recycled to the reactor, the melt index of the polymer truly became a function of the hydrogen concentration in the liquid diluent. These findings will be demonstrated in the examples.

Various methods can be employed for the input of heat to an introduced hydrogen stream or to a recycle hydrogen stream. Ordinarily, very small amounts of hydrogen are consumed during the polymerization reaction and the preponderant amount of it must either be discarded (uneconomical) or taken to storage or recycled directly to the reactor. Where the hydrogen is recycled directly to the reactor and minor amounts of hydrogen are added to keep a certain mole percent of hydrogen in the polymerization vessel, one technique for accomplishing the purpose of this invention is to recycle the hydrogen through a blower (or compressor) without cooling and return it to contact the liquid phase by any suitable means, such as by a dip leg inserted in the reactor below the liquid level. Since, in this case, the hydrogen taken from the vapor space is at a higher temperature than the liquid mixture in the reactor, the sensible heat contained in the hydrogen is sufficient to accomplish the purpose of this invention. Where low polymerization temperatures are employed, for example, room temperature, it becomes desirable to heat the hydrogen to from 10° to 25° F. above the reaction temperature.

Where the amount of heat in the hydrogen recycle stream is desired to be maintained at a temperature substantially equivalent or above that existing in the reaction zone, such as in the case above, no cooling equipment is employed in recycling the hydrogen. To control polymerization temperature, however, it may then be necessary to use jacket cooling in the reactor in order to maintain predetermined reaction temperature.

The introduced hydrogen can also be heated, if desired, by any other means such as, for example, by heat exchange means as is known in the art. Additional methods of heating a hydrogen stream introduced to a reactor will be apparent to those skilled in the art. The method employed by the process of this invention has reference to the above described process wherein the control of the reaction temperature is by jacket cooling and the hydrogen recycle stream is continuously recycled without cooling.

It is not completely apparent why the process as herein described is capable of producing polymers of from as low a melt index as 0.1, for example, to as high as 30 if desired. It is believed, however, that the hot hydrogen diffuses more rapidly at higher temperatures in the hydrocarbon diluent and therefore reaches equilibrium at a faster rate so that a favorable K value is reached much faster than if this hydrogen were introduced to the recycle stream at a substantially lower temperature.

The operation of the process of this invention is preferably continuous, that is, the polymerization reaction is continuous, as well as the recycling of the hydrogen. It is not necessary, however, that the polymerization reaction be continuous, since ordinarily batch polymerization reactions can be carried out for a residence time of from 30 minutes to as long as 2 hours or more. During this batch operation, however, the hydrogen is recycled either continuously or intermittently so long as sufficient hydrogen is available in the liquid phase to give the desired melt index control. In either method of operation, that is, a continuous or intermittent hydrogen recycle, it is essential, according to the process herein, to introduce the hydrogen to the reactor below the liquid level in the polymerization vessel and at the temperatures heretofore indicated.

Reference will now be made to specific examples to illustrate the process of this invention.

*Example 1*

A series of runs were made at about 165° to 168° F. employing butane as the inert polymerization medium at a pressure of about 275 p.s.i.g. using $TiCl_3 \cdot AlCl_3$ activated with aluminum triethyl in amounts of from 0.29 to 1.0 gram per liter catalyst concentration in a 100 gallon volume reactor, the reactor being about half filled with the polymerization ingredients. Hydrogen was pressured into the reactor after addition of ethylene and catalyst. The hydrogen was recycled to the reactor at the temperatures indicated in Table I below and introduced through a dip pipe below the liquid level. The reactor temperature was maintained at the desired temperature by fluid circulating around the reactor. The Al/Ti ratios for the various runs ranged from 1.0 to 2.7.

The runs illustrated in Table I were batch polymerization with around 90% $H_2$ (butane-free bases) in the reactor vapor space with hot recycling of hydrogen.

TABLE I

| Run No. | 1 | 2 | 3 | 4 | 5 | 6 |
|---|---|---|---|---|---|---|
| Temp. of $H_2$ Recycle, °F | 156 | 165 | 159 | 167 | 160 | 167 |
| Ethylene, Partial Pressure, p.s.i. | 19 | 17 | 11 | 9 | 11 | 12 |
| Actual $H_2$ Concentration, Percent (Butane-free bases in reactor vapor space) | 87 | 87 | 91 | 93 | 91 | 90 |
| Melt Index | 3.2 | 5.4 | 5.5 | 5.7 | 7.4 | 30.0 |

In order to be able to compare the results of this technique of hot hydrogen recycle, reference is now made to Example 2 and Table II below.

*Example 2*

This series of runs was carried out under substantially the same conditions as those of Example 1, except that the reactor pressures were varied as indicated, as well as the amount of hydrogen in the reactor vapor space. Additionally (Runs 3, 4 and 5) for comparison purposes, hydrogen was recycled in a conventional manner, that is, by cooling recycle vapors with a condenser.

TABLE II

| Run No. | 1 | 2 | 3 | 4 | 5 |
|---|---|---|---|---|---|
| Temp. of $H_2$ Recycle, °F | 162 | 155 | 118 | 148 | 152 |
| Ethylene Partial Pressure, p.s.i. | 36 | 18 | 55 | 62 | 36 |
| Actual $H_2$ Concentration, Percent (Butane-free bases in reactor vapor space) | 59 | 75 | 50 | 41 | 61 |
| Total Reactor Pressures, p.s.i.g. | 225 | 168 | 250 | 198 | 240 |
| Melt Index | 2.5 | 2.6 | 0.07 | 0.11 | 1.0 |

A series of runs duplicating the conditions of Examples 1 and 2, but without hydrogen resulted in polymers of ethylene of no measurable melt index.

The foregoing examples clearly demonstrate (Table I, Runs 1–6, and Table II, Runs 1 and 2) the beneficial effect of a "hot" hydrogen recycle to the reaction zone in comparison to a "cold" (Table II, Runs 3, 4 and 5) hydrogen recycle technique. Thus, in Table II, Run 3, where recycle hydrogen was at a temperature of between 40° to 50° F. below the reaction temperature, the melt index of the polymer was barely measurable using the ASTM procedure indicated. As the temperature of the hydrogen recycle was increased as in Runs 4 and 5, the molecular weight of the polymer was more effectively controlled and melt indices of the polyethylene increased to 1.0. The melt indices of the polymers produced employing hydrogen recycle temperatures from 10° F. below the reaction temperature to substantially the reaction temperature could be readily varied as indicated.

The foregoing runs were 2 hour batch runs with continuous hydrogen recycle to the reactor liquid. Temperature of the recycled hydrogen can be measured preferably just prior to introduction to the reactor via the dip leg. Any other location, however, is suitable so long as large error in the measurement is eliminated.

While the above runs have demonstrated the process of this invention, it is within the scope hereof to select an adequate recycle temperature for the hydrogen to yield a particular polymer melt index. Thus, where reactions are carried out at temperatures of about 70° to 90° F., then the hot recycled hydrogen should preferably be at least at reaction temperature, but can be as high as 25° F. above in order to insure the melt index control desired. Jacket cooling can be used effectively to control the polymerization temperature and the recycled hydrogen can be metered into the reactor in the desired quantities and selected temperature to obtain a polymer with the melt index desired.

Where higher temperatures are employed in the polymerization reaction, such as 160° to 180° F., then the recycle temperature can be readily below the polymerization temperature, for example, 10° F., and still be effective in the manner desired. Big recycle temperature differences, that is, 30° to 50° F. lead to difficulty in molecular weight control in systems such as illustrated in the examples.

The amount of hydrogen employed is not critical and can range from 0.001 mole percent of the monomer and up to 99 mole percent, preferably 0.1 to 90 mole percent as heretofore taught in Vandenberg Patent 3,051,690.

Resort can be had to variations and modifications of the process herein without departing from the scope of the appended claims.

What is claimed is:

1. In a process for polymerizing ethylene wherein hydrogen is employed to effect molecular weight control which comprises polymerizing in a reaction zone said ethylene with a catalytic amount of a catalyst formed by mixing titanium trichloride with an aluminum alkyl, said reaction zone being operated at a temperature of from room temperature to about 200° F. and a pressure of from about 150 to 5000 p.s.i. in the presence of an inert hydrocarbon diluent having a boiling point of from −45° to 0° C. and being in the liquid phase at the operating conditions in said reaction zone, the improvement which comprises continuously and separately introducing hydrogen substantially free of other materials below the liquid level in said reaction zone at a temperature of from about 10° to 25° F. higher than the operating temperature for polymerization reactions carried out at from room temperature to about 125° F. and from about 10° F. below to 25° F. above the operating temperature for reactions carried out at from 125° F. to about 200° F. whereby the melt index of the resulting polyethylene becomes a function of the hydrogen concentration in the liquid diluent and recovering from said reaction zone said polyethylene having a density of at least 0.96.

2. The process of claim 1 wherein the operating temperature in said reaction zone is from about 125° F. to about 200° F. and the temperature of the continuously introduced hydrogen is from about 10° below to 25° F. above the operating temperature in said reaction zone.

References Cited

UNITED STATES PATENTS 3,051,690   8/1962   Vandenberg _____ 260—94.9

OTHER REFERENCES

Sittig: Polyolefin Resin Processes, 1961, PSO 50, 119, 146 (copies already included in folder).

JOSEPH L. SCHOFER, *Primary Examiner.*

L. EDELMAN, *Assistant Examiner.*